Aug. 18, 1970   J. R. HOBBS   3,524,342
APPARATUS FOR DETECTING SURFACE LEAKAGE
Filed June 10, 1968   2 Sheets-Sheet 1

INVENTOR.
JOHNSTON R. HOBBS
BY J. Peter Mohn
ATTORNEY

Aug. 18, 1970   J. R. HOBBS   3,524,342
APPARATUS FOR DETECTING SURFACE LEAKAGE
Filed June 10, 1968   2 Sheets-Sheet 2

INVENTOR.
JOHNSTON R. HOBBS
BY
J. Peter Mohn
ATTORNEY

United States Patent Office 3,524,342
Patented Aug. 18, 1970

3,524,342
APPARATUS FOR DETECTING
SURFACE LEAKAGE
Johnston R. Hobbs, La Jolla, Calif., assignor to Rohr Corporation, Chula Vista, Calif., a corporation of California
Filed June 10, 1968, Ser. No. 735,798
Int. Cl. G01m 3/02
U.S. Cl. 73—40                                       2 Claims

ABSTRACT OF THE DISCLOSURE

A method and apparatus for detecting leakage, or fluid tightness, of a surface. The method includes the steps of flattening a suction cup over the surface to be tested, pulling on the cup to create a vacuum therein, and measuring the vacuum so developed. A tight or leak-free surface will result in a greater vacuum being created than with a leaky one. Two embodiments of apparatus are disclosed. Each includes a suction cup, a handle and a means for measuring vacuum within the cup when pulled by the handle.

BACKGROUND OF THE INVENTION

This invention relates to leak detecting devices and more particularly to a leak detecting method and apparatus utilizing vacuum measurement in its operation.

In many arts involving the construction and assembly of sheet metal structures, wherein the final structure must be fluid tight, detection of small leaks around fasteners, joints, etc. becomes an omnipresent problem. In one such art, to wit, the construction of aircraft structures such as fuselages, wings, etc., it is imperative that all surfaces be airtight. Such aircraft must be capable of being internally pressurized, for well-known reasons, and hence must be airtight. With the innumerable rivets that go into construction of such aircraft it follows that associated with each rivet that passes through the outer skin is a vulnerability to leakage. Unless the hole for a rivet is bored in proper alignment and the rivet is properly seated therein the noted leakage may develop.

The testing of such structures as fuselages presently involves sealing off same and subjecting the interior to a higher than atmospheric pressure. If leakage is present, pressure will not be able to be maintained. To determine where the pressure is being lost may then become a most tedious and expensive process.

It is therefore desirable to minimize occurrences of final assembly pressure failures in the aircraft art.

The use of the instant method and apparatus permits a running check to be kept on the quality of such potential leak producers as misaligned rivets early in the production operation. For example, when spot checks are made of riveting work where small panels which ultimately are assembled into the fuselage are constructed, many trends towards numerous instances of leaky panels may be averted. It has been found that where the method and apparatus of this invention are used, the overall quality of finished assemblies has improved multifold.

All of the benefits of the instant invention are equally applicable to arts other than aircraft construction where fluid tight surface joints and seals are required.

SUMMARY OF THE INVENTION

Accordingly, an object of this invention is to provide a method and apparatus for detecting leaks.

Another object of this invention is to provide a simple yet efficient method and apparatus for detecting fluid leaks in various structures.

Yet another object of this invention is to provide a simple yet positive indication of leaky fastenings between various structural components.

A more particular object of this invention is to provide a method and apparatus for readily detecting leaky rivets in aircraft structures.

This invention achieves the above noted objects by providing a simple method and apparatus utilizing vacuum techniques for leak detection. The method comprises the steps of flattening a flexible cup over an area in which leakage is suspected, pulling on the vacuum cup to increase its volume and hence the vacuum thereunder, and finally indicating the vacuum as a measure of the leakage of the area.

Various forms of apparatus may be used to practice the method of this invention. Two such forms are described herein and comprise a suction cup, and a vacuum measuring device arranged to communicate with the interior of the suction cup. A handle structure is attached to the cup and provides a ready means by which the pulling force may be exerted on the cup.

The above noted objects and features of this invention will be better understood from the ensuing detailed description and claims taken in conjunction with the attached drawings wherein:

DETAILED DESCRIPTION

It should be noted at this point that the same numerals have been used to indicate the same parts or elements throughout the various figures and the specification.

Figure 1:
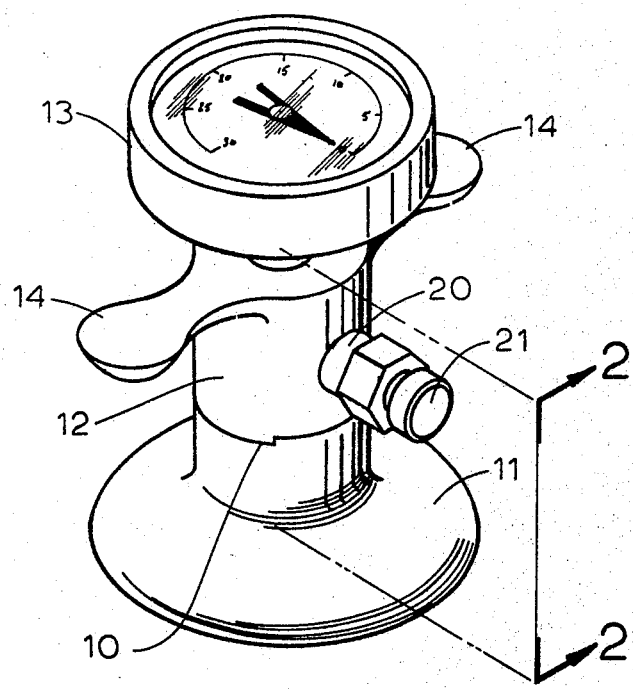
FIG. 1 is an isometric view of one embodiment of apparatus constructed in accordance with this invention.

Referring now to FIG. 1 one embodiment of a surface leakage detector constructed in accordance with the present invention is shown. The embodiment of FIG. 1 generally comprises a suction cup 11, a handle structure or body 12 and a vacuum indicating or measuring means generally designated 13. Suction cup 11 may be constructed of any flexible or readily deformable material such as rubber. The particular size of the cup may be chosen dictated by what the area to be tested is. The vacuum detecting means 13 as shown comprises a meter, or vacuum gauge, of the standard type, readily available at any appropriate parts supplier. The meter is so designed as to detect negative pressure, i.e., pressures below atmospheric, and provide a visual indication of the magnitude of such pressure.

In the embodiment of FIG. 1, handle structure 12 includes two finger-engaging portions 14 formed as an integral part thereof and so sized as to be readily gripped by a pair of human fingers.

Figure 2:
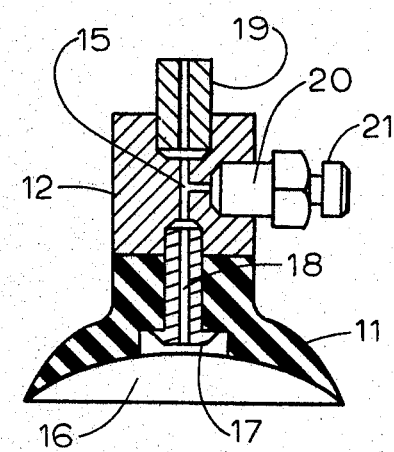
FIG. 2 is a partial cross-sectional view of the embodiment of FIG. 1 taken along the line 2—2 thereof.

Referring to the sectional view of FIG. 2, it can be seen that body 12 is provided with a central bore 15 for connecting the interior 16 of the suction cup 11 with the vacuum measuring device or gauge 13. The base of body 12 is drilled and threaded to receive a screw 17 which attaches the cup 11 to the body. The screw 17 has a central bore 18 arranged to communicate with the bore 15 of the body 12. On the top of the body structure 12, a threaded tube 19 is seated for attachment of the gauge 13. Valve 19 is also threaded to the body 12 and arranged to vent the interior bore 15 of the body to the atmosphere when button 20 is pressed. The details of the valve 19 are not shown for many suitable devices are available to perform the noted functions. It should also be noted that valve 19 is not necessary for the operation of the embodiment of FIG. 1 but merely simplifies such operation by providing a means for readily disengaging the suction cup from an area being checked by relieving the vacuum therein when the checking is completed.

Body 12 may be constructed of any suitable rigid nonporous material such as metal or plastic. It may also be noted from FIG. 1 that the base of the body 12 may be provided with a raised section such as at 10 for mating engagement with a complementary lowered portion on suction cup 11. This latter structure prevents cup 11 from rotating while being fastened to the body 12 by screw 17 and consequently makes for a more integral assembly.

It can be further noted at this point that although assembly of the various parts of the illustrated embodiment has been referred to as being by threading engagement, such construction is merely exemplary. The various parts could also be assembled by other techniques such as adhesives, etc., so long as air tightness is maintained within the inner bore 15.

Figure 3:
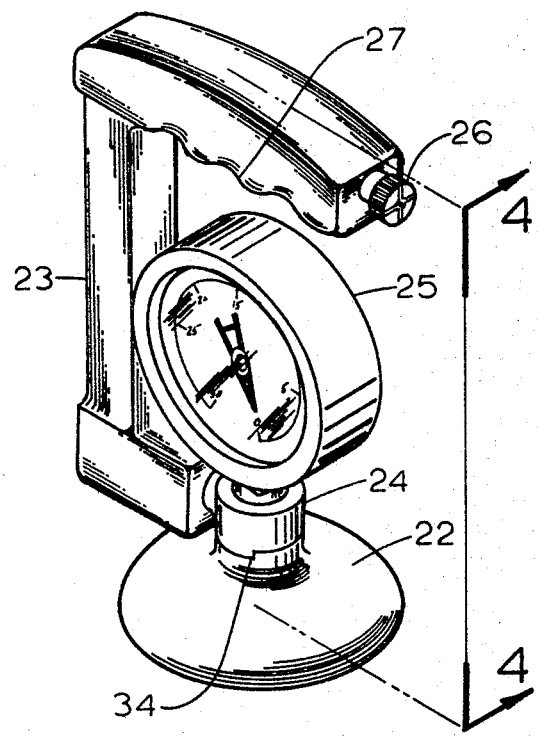
FIG. 3 is an isometric view of another embodiment of an apparatus constructed in accordance with this invention.
Figure 4:
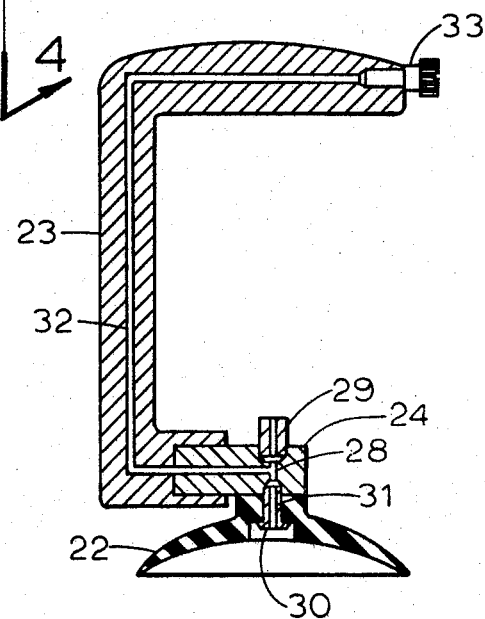
FIG. 4 is a partial sectional view of the apparatus of FIG. 3 taken along the line 4—4 thereof.

One embodiment of the invention having thus been described, reference should now be made to FIGS. 3 and 4 which show another embodiment differing slightly in its construction but relying on the same basic principles of operation. The operation of both devices will be explained at a later point. Referring now to FIG. 3 in particular, the other embodiment of the invention may be seen to comprise a suction cup 22, a handle structure 23, a body 24, gauge 25 and a release valve 26. The primary difference between the two embodiments is in the shape of the handle structure 23. As can be noted from the figure the embodiment of FIG. 3 has a generally "C-shaped" handle with the upper portion being provided with serrations or scallops such as at 27 for receiving fingers of a human hand in a gripping fashion.

Referring to FIG. 4 it is apparent that the construction of the second embodiment is quite similar to that of the first. In particular body 24 is provided with a bore 28 which extends therethrough and communicates the interior of suction cup 22 with the meter or gauge, not shown in FIG. 4 but which would be attached by threaded tube 29. Suction cup 22 is mounted to body 24 by screw 30 having a central bore 31 to align with bore 28 of the body 24. Handle 23 is also provided with a bore 32 therethrough for communicating body bore 28 with the vacuum release valve 33. Handle 23 is drilled and tapped to receive the threaded portion of body 24 in the particular embodiment shown. Once again other suitable attachment techniques could be used so long as airtightness is maintained between the central bore 32 of the handle and the atmosphere.

Details of release valve 33 are not shown since once again numerous devices of such nature are available in the art and the particular valve used does not form a part of this invention. Furthermore, as in the first embodiment, release valve 33 is not necessary to the basic operation of the device.

It can be noted in FIG. 3 that body 24 may also be provided with a raised portion such as at 34 with suction cup 22 having a complementary lowered portion for a more rigid connection between the two parts.

As with the embodiment of FIGS. 1 and 2, various materials could be used to construct that of FIGS. 3 and 4. Once again the only qualification of such materials be that they be rigid and non-porous.

OPERATION

Figure 5:
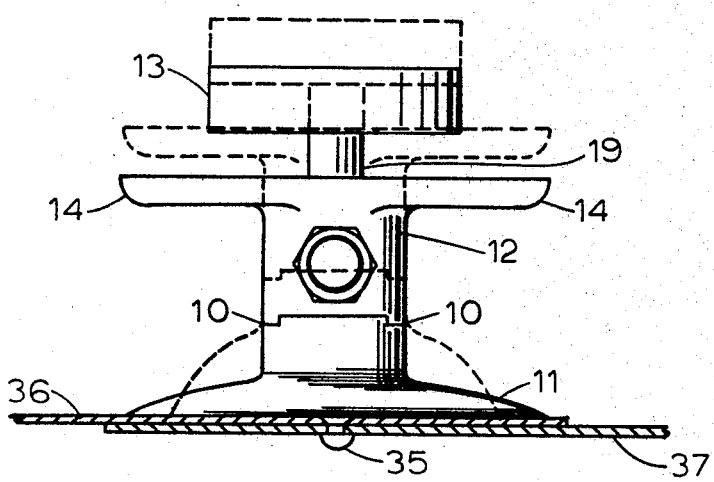
FIG. 5 is a side view of the apparatus of FIG. 1 showing in phantom how it is utilized.

Since both of the disclosed embodiments operate in essentially the same manner by practicing the same method, the operation of only one embodiment will be described in detail. For ease in understanding such operation reference should now be made to FIG. 5 which shows in somewhat schematic form how the embodiment of FIGS. 1 and 2 is used. It can be assumed at this point that for purposes of description of the operation the airtightness of a rivet used to fasten two rigid flat plates together is to be checked. The rivet 35 is shown in FIG. 5 along with first and second plates 36 and 37 respectively in cross-sectional form. In accordance with the method of operation of this invention suction cup 11 is pushed against the upper plate 36 and substantially flattened on the plate's surface, much in the manner a dart is affixed to a smooth surface. As in the case of a dart, if a force is then applied tending to pull the cup away from the surface, the vacuum created on the interior of the cup or dart tends to resist such pulling. The reason that the vacuum exists within the cup is of course based on the principle that when the cup 11 is flattened on the surface, the air within its interior is forced out along its edges and the ultimate volume within the cup is rather small. When the interior volume is then attempted to be enlarged by pulling and deforming the cup, it naturally follows that the interior pressure decreases by well-known principles of basic physics. In the operation as described to this point, it has been assumed that the surface of plate 36 is airtight, that is leak-proof. It is further assumed that the plates are secured or prevented from moving. In such case then, as human fingers gripped handles 14 and pulled away from the plate 36, a measurement of vacuum would be indicated on meter or gauge 13. Translation of the device resulting from such a pulling force is shown in phantom in FIG. 5.

If instead of being tight, plate 36 was somehow vented to the atmosphere at a point underneath the area covered by the cup 11, e.g., by a hole therethrough, one would be unable to make the cup stick to the surface since it would be impossible to create a vacuum within same.

The utility of this invention exists within those situations essentially lying between the two extremes noted so far. In particular, in the rivet-checking mode of operation, for calibration purposes the device is manipulated over a surface containing a rivet known to be seated and secured in a desired manner. The magnitude of the vacuum which can be created by pulling on the device when located over such a rivet then determines a standard to which all rivets should compare. In checking aircraft fuselage sections the standard for example substantially equals the pressure differential between the interior and exterior which would be present with the aircraft pressurized and flying at some desired maximum altitude. If a rivet is then checked which for some reason is not seated properly, slight leaks will exist between the surface thereof exposed to the suction cup 11 and the opposite surface thereof vented to the atmosphere. It will therefore be impossible to create a vacuum having a magnitude the same as that achieved over a perfect or tight rivet. An indication of a lower magnitude of vacuum immediately informs the operator of the device that a fault has been detected and corrective measures may immediately be taken to eliminate same. If a vacuum equal to the standard is measured on the gauge, then the operator is informed that the particular rivet is good.

Assuming that the surface that is checked is a tight one, removal of the device therefrom is the final step in the operation. On such tight surfaces, excessive force may be required to break the cup 11 away from the surface. In such instances actuating the release valve 20 vents the interior of cup 11 to the atmosphere and permits the ready removal of the device. The latter follows from the fact that the venting releases the vacuum existing on the interior of the cup 11.

As noted the operation of the embodiment of the FIGS. 3 and 4 is identical with the only difference being the manner in which the device of those figures is manipulated by the operator.

It should be again emphasized that although the instant invention has been described particularly in relation to the checking of aircraft rivets its uses are not limited thereto for it would be equally applicable to all other applications where surface airtightness or fluid tightness must be tested in a simple manner.

It should be apparent therefore that this invention provides a simple yet efficient method and apparatus for detecting surface leakages.

Although the invention has been described in terms of two particular embodiments thereof it should not be limited thereto for various changes and modifications could be made by one having ordinary skill in the art without departing from the spirit and scope of the invention.

What is claimed is:

1. Apparatus for testing the airtightness of a smooth work area which is restrained against lifting comprising
   a suction cup of resilient material having a sealing peripheral rim and a normally concave lower surface,
   a push-pull handle connected to a central area of the suction cup so that the exertion of a pushing force on the handle flattens the lower surface of the suction cup against the work surface therebeneath, and the exertion of a subsequent pulling force on the handle away from the restrained work area, in the event said work area is airtight increases the volume and decreases the pressure within the zone between the lower surface of the vacuum cup and the airtight work area, and
   a vacuum gauge having a vacuum indicator thereon mounted on the handle and openly communicating with the zone between the vacuum cup and such air tight workpiece through a duct having a total volume so small, relative to the volume of said vacuumized zone when so expanded by a pulling force on said handle, as to not prevent vacuum adherence of the vacuum cup to such airtight work surface.

2. Apparatus for testing the airtightness of a smooth work area, comprising
   a suction cup of resilient material having a sealing peripheral rim and a lower face movable from a flat condition substantially co-planar with the peripheral rim, to a concave condition,
   force applying means operatively connected to the central portion of the vacuum cup to move the vacuum cup from said flat to said concave condition with the rim in sealing engagement with such smooth work area, and
   a vacuum gauge operatively communicating with the under side of the vacuum cup inwardly of the rim through a duct having a total volume so small, relative to the volume of the vacuum cup in its concave condition, as to not prevent vacuum adherence of the vacuum cup to such smooth work area when the latter is airtight.

References Cited

UNITED STATES PATENTS

| 1,371,484 | 3/1921 | Howard | 73—40 |
| 2,106,407 | 1/1938 | Hensley | 73—45.3 |
| 2,255,921 | 9/1941 | Fear | 73—46 XR |

FOREIGN PATENTS

| 16,794 | 4/1904 | Great Britain. |
| 638,961 | 3/1935 | Germany. |

LOUIS R. PRINCE, Primary Examiner

W. A. HENRY II, Assistant Examiner